United States Patent [19]

Mark

[11] 4,196,932
[45] Apr. 8, 1980

[54] BOTTOM DISCHARGE GATE AND ACTUATING MECHANISM

[75] Inventor: Werner J. Mark, Orangeville, Canada

[73] Assignee: Alforge Metals Corporation, Limited, Orangeville, Canada

[21] Appl. No.: 891,656

[22] Filed: Mar. 30, 1978

[51] Int. Cl.² ............................................. B60P 1/56
[52] U.S. Cl. .................................... 298/30; 92/37; 105/240; 105/283
[58] Field of Search .................. 298/30, 29, 27, 24; 222/556, 558; 105/240 X, 283 X; 92/37 X, 39

[56] References Cited

U.S. PATENT DOCUMENTS

| | | | |
|---|---|---|---|
| 719,868 | 2/1903 | Randel | 298/30 X |
| 2,120,269 | 6/1938 | Sloan | 222/558 X |
| 3,601,606 | 8/1971 | Cook | 92/39 X |

*Primary Examiner*—Stephen G. Kunin
*Assistant Examiner*—George F. Abraham
*Attorney, Agent, or Firm*—Arne I. Fors; Robert F. Delbridge

[57] ABSTRACT

A hopper gate and pneumatic actuating mechanism for controlled discharge of bulk materials from a bottom-unloading vehicle are described. The hopper gate comprises an arcuate closure plate pivotally mounted by wedge shaped end plates below a rectangular hopper opening, said hopper opening having one edge defining the end of a hopper end elevated higher than the opposed edge defining the other hopper end wall. The pneumatic actuating mechanism comprises a pair of opposed air bags selectively expanded by an air supply and operatively connected to the closure gate by a linkage system for opening and closing the gate.

4 Claims, 9 Drawing Figures

4,196,932

BOTTOM DISCHARGE GATE AND ACTUATING MECHANISM

BACKGROUND OF THE INVENTION

This invention relates to a hopper gate and actuating mechanism for bottom-unloading vehicles and is particularly directed to an improved hopper gate and pneumatic actuating mechanism for road trailers used for the transport and controlled unloading of bulk loads.

The discharge of bulk materials such as sand, gravel, crushed stone and the like from a bottom-discharge vehicle can be difficult to control once started in that the gate mechanism, such as swinging doors, cannot be closed against the weight of the load of material being discharged. This shortcoming of many bottom-unloading mechanisms can be important if the load discharged is a construction material such as sand, gravel or crushed stone which is desired to be spread evenly to a uniform thickness over a predetermined distance on a road bed or construction site.

It is an important object of the present invention to provide an improved bottom-discharge gate mechanism for use with road trailers.

It is another object of my invention to provide an improved bottom-discharge gate mechanism of simple construction and positive operation which will controllably discharge bulk materials.

Another object of my invention is the provision of a pneumatic actuating mechanism which obviates the need for a relatively more expensive and more complex piston-cylinder assembly.

SUMMARY OF THE INVENTION

These and other objects of my invention can be attained by a bottom-unloading gate apparatus comprising, in combination, a substantially vertical lower portion formed in one of said inclined end walls defining a bottom edge extending the width of said end wall, said other inclined end wall defining a bottom edge extending the width of said end wall whereby said edges are spaced apart and parallel with each other to define a rectangular hopper opening therebetween extending from one side to the other, said bottom edge in the substantially vertical portion of the one end wall being higher than the bottom edge of the other end wall, an arcuate closure plate extending between said side walls and said end wall bottom edges adapted to close said hopper opening, said closure plate having end supports pivotally mounted in said side walls and having a transverse radius of curvature substantially equal to the radius of pivot of said end supports, each of said side walls between the bottom edges of the mutually-inclined end walls terminating in convexly-rounded edges having said radius of curvature, whereby said closure plate can pivot into and out of said opening in sealing engagement therewith, and actuating means for pivoting said closure plate into and out of said hopper opening.

The actuating mechanism of the invention comprises a pair of opposed air bags mounted within a frame, said air bags having adjacent ends and opposite ends, floating means interconnecting said air bags adjacent ends adapted for reciprocal substantially linear movement and stationary means rigidly connecting the opposite ends of the air bags to the frame, whereby selective expansion of one air bag by introduction of air under pressure thereto and exhaust of air from the other air bag permits linear movement of said floating means, and linkage operatively connecting said floating means to said closure plate whereby said closure plate can be extended into or retracted from the hopper opening by linear movement of the floating means.

BRIEF DESCRIPTION OF THE DRAWINGS

The apparatus of the present invention will now be described in detail with reference to the accompanying drawings in which.

DESCRIPTION OF THE PREFERRED EMBODIMENT

Figure 1:
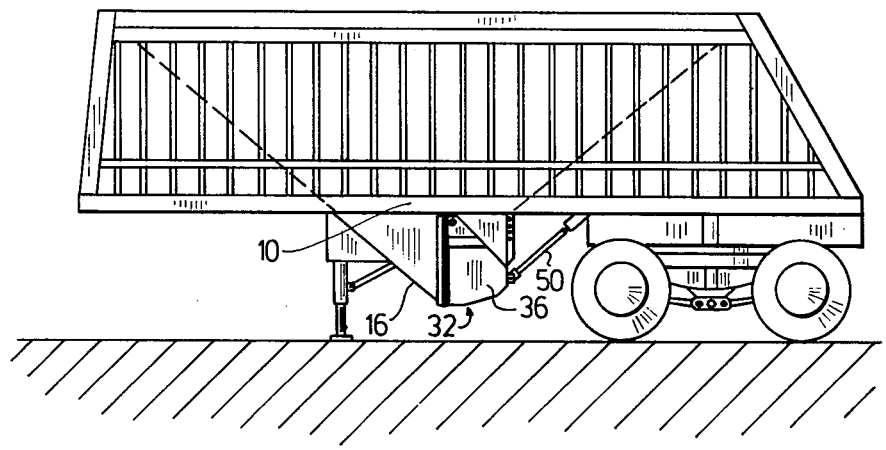
FIG. 1 is a side elevation of a road trailer incorporating the bottom-discharge gate mechanism of the present invention as a component thereof.
Figure 7:
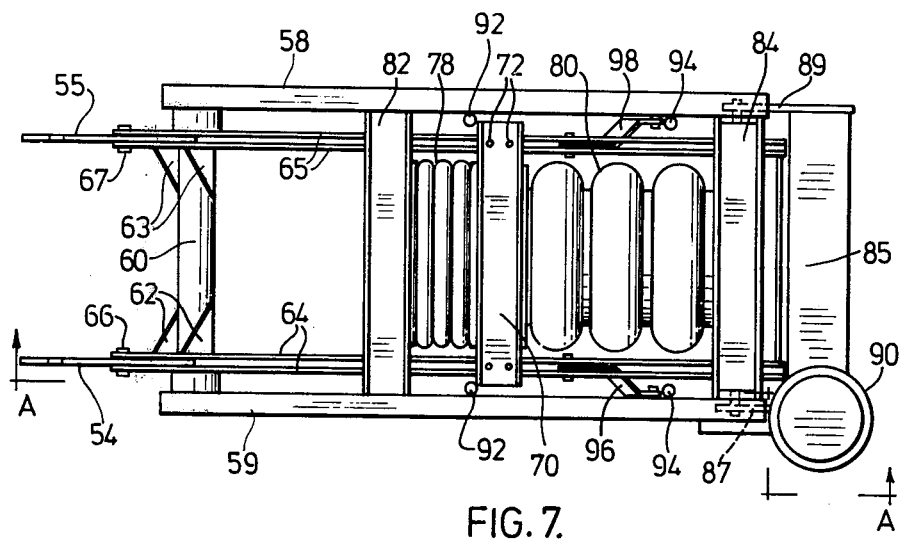
FIG. 7 is a plan view of the actuating mechanism of the invention corresponding to the closed position of the gate apparatus illustrated in FIGS. 1–5.

With particular reference to FIGS. 1 and 7, the gate mechanism of my invention is shown incorporated as part of the bottom construction of a road trailer having side walls 10,12 and inclined floor panels 14,16 which define a hopper bottom having a slope substantially equal to the angle of repose of the materials transported. Floor panel 14 has a substantially vertical lower portion 18 terminating at a transverse lip 20 extending the width of portion 18. Inclined floor panel 16 terminates at a transverse angle member 22 having downwardly depending flange lip 23 at a level below opposed transverse lip 20 for reasons which will become apparent as the description proceeds.

Side walls 10,12 terminate at their lower extremities in convexly-rounded arcuate edges 26, one of which is shown, having a radius of curvature substantially equal to the curvature of bottom closure plate 30 of gate 32 which is pivotally mounted for movement about axis 34 in close-fitting relationship with arcuate edges 26. Closure plate 30 of gate 32 is supported at its ends by side wall sectors 36,38 which are pivotally mounted on stub shafts 40, one of which is shown, extending from each of side walls 10,12. Shaft 40 is shown passing through reinforced upper section 41 of sector 36, spacer washer 43 and through side wall 10 with a washer 45 secured thereto such as by welding to prevent withdrawal. The forward edge 35 of each sector 36,38 abuts the flange 37 of angle 39 secured to each side wall 10,12 when gate 32 is in its closed position, as shown most clearly in FIG. 2.

The floor panels, walls and component parts of the assembly are fabricated of aluminum or steel, preferably welded together into a rigid integral structure. Transverse external stiffener ribs 44 extend the length of bottom closure plate 30 and abut the inner surfaces of side walls 36,38. Rib 44 shown in FIG. 3 has a tapered forward edge which is coextensive with and welded to the forward edge of closure plate 30 to form an acute edge which abuts flange lip 23 under the rearward overlapping edge of inner wall 16'.

Figure 2:
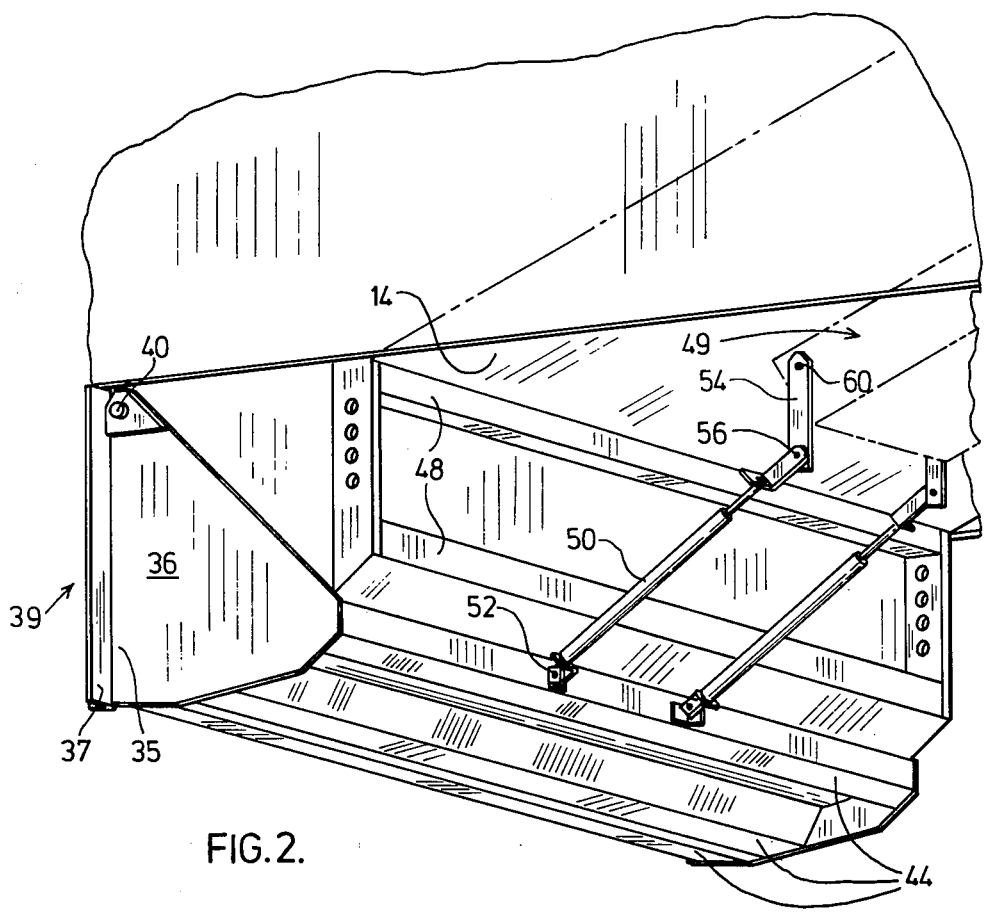
FIG. 2 is a perspective view, from the rear, of the bottom-discharge apparatus of the invention shown in FIG. 1.
Figure 4:
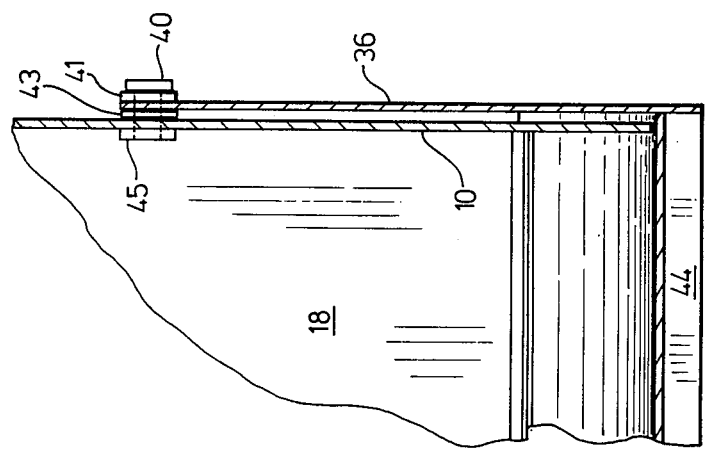
FIG. 4 is a vertical section taken along the line B–B of FIG. 5.
Figure 3:
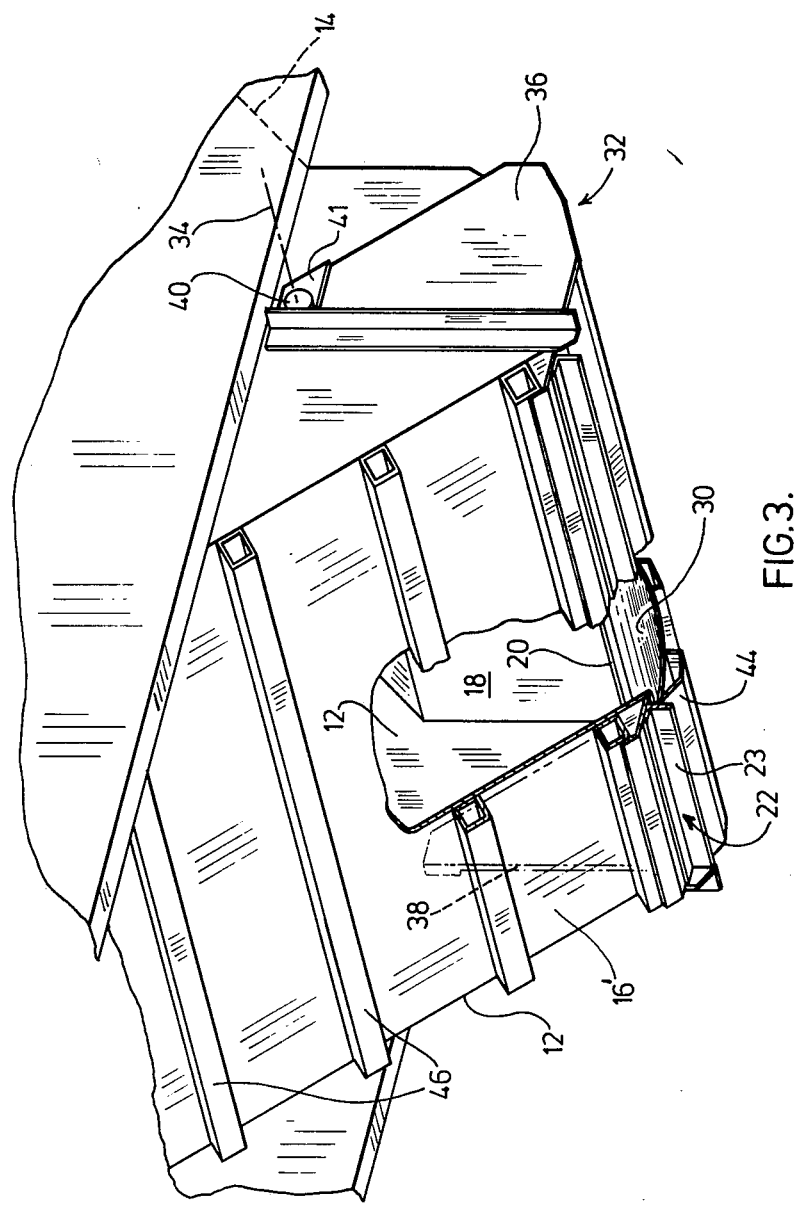
FIG 3 is a perspective view, partly cut away and with the exterior floor wall removed, from the front, of the bottom-discharge apparatus of the invention shown in FIG. 1.

A plurality of transverse stiffener ribs or box sections 46 extend across floor panels 14 and 16 which preferably are of double-wall thickness for added strength and rigidity, FIGS. 1, 2, 5 and 6 showing the outer walls with FIG. 3 showing the inner wall 16' only with the outer wall removed for clarity of description.

Figure 5:
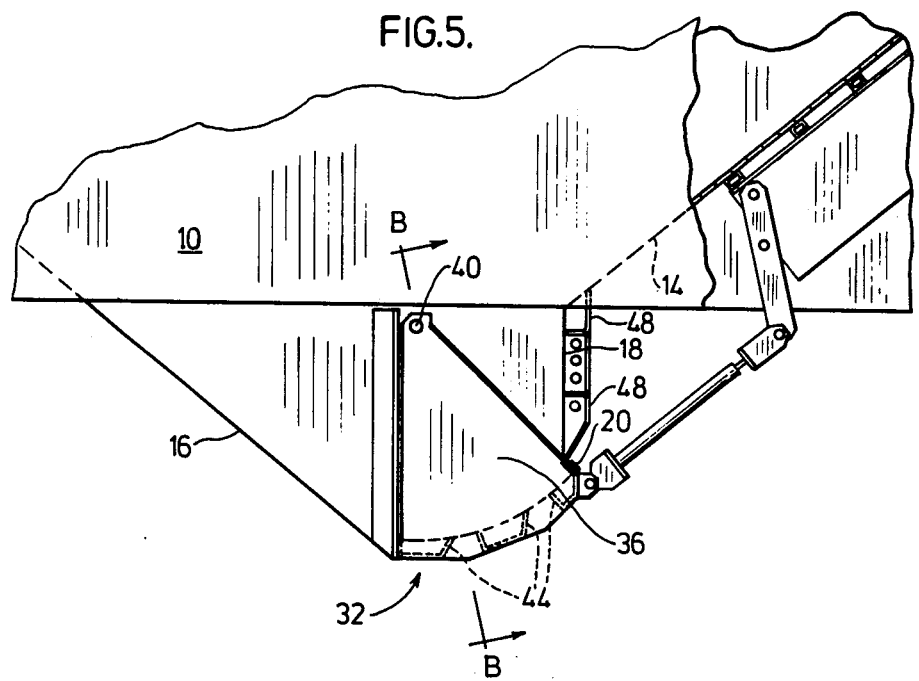
FIG. 5 is a side elevation, partly cut away, of the apparatus shown in FIG. 1 in a closed position.
Figure 6:
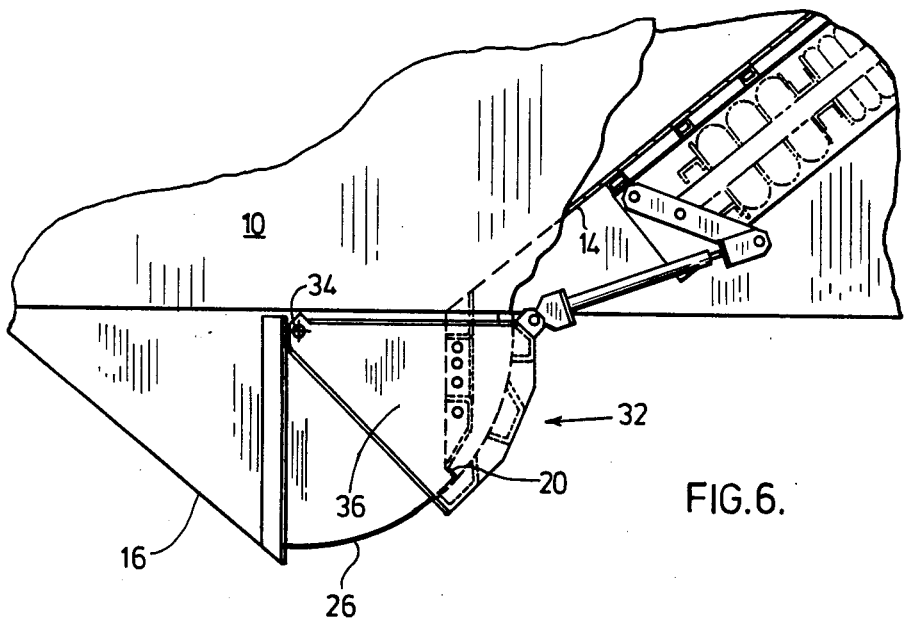
FIG. 6 is a side elevation, partly cut away, of the apparatus shown in FIG. 5 in an open position.

The actuating mechanism designated by numeral 49 for opening and closing gate 32 is connected to gate 32 by a pair of spaced parallel linkages 50 pivotally connected thereto by pin 52 as illustrated most clearly in FIGS. 2, 5 and 6. Linkages 50 are extensible to permit adjustment of their lengths of travel for reasons which will become apparent as the description proceeds.

Figure 8:
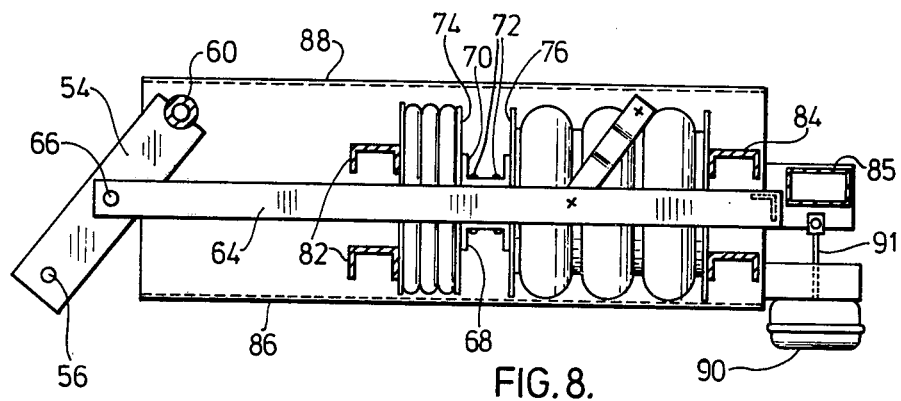
FIG. 8 is a side elevation of the actuating mechanism, partly in section, taken along line A–A of FIG. 7.
Figure 9:
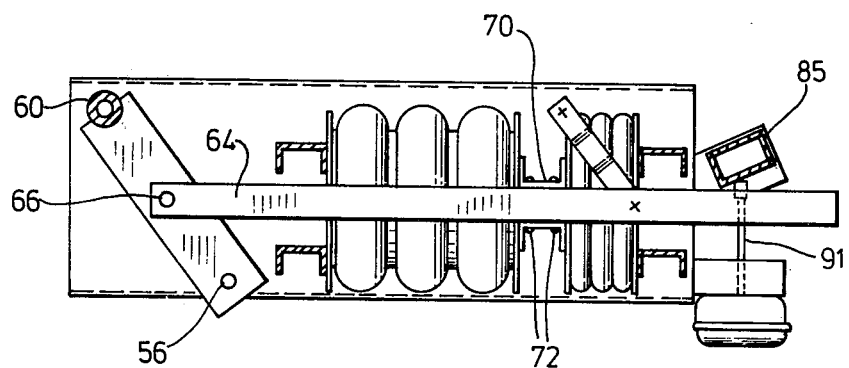
FIG. 9 is a side elevation of the actuating mechanism as viewed in FIG. 8 corresponding to the open position of the gate apparatus. Like reference characters refer to like parts throughout the description of the drawings.

With reference now to the embodiment of the pneumatic actuator illustrated in FIGS. 8–9, FIG. 7 is a plan view of actuating assembly 49 and FIGS. 8 and 9, taken along the line A—A of FIG. 7, show the actuator in its extended (closed) and retracted (open) positions respectively. The opposite ends of linkages 50 (FIG. 2) are pivotally connected by pins 56 to spaced-apart links 54,55 which are rigidly connected by gussets 62,63 to shaft 60 which extends between and is journalled for rotation in side walls 58,59. Each of side walls 58,59 has longitudinal flanges 86,88 formed in its bottom and top edges respectively to provide rigidity and to permit mounting of the actuating assembly on the underside of floor panel 14.

Linkages 54,55 are pivoted about the axis of shaft 60 by pairs of elongated reciprocal links 64,65 pivotally connected at one end to links 54,55 by bolts 66,67. Each pair of links 64,65 is rigidly connected to floating transverse channels 68,70 such as bolts 72. Mounting plates 74,76 secured to the flanges of channels 68,70 are, in turn, secured to triple convoluted air bags 78,80 fabricated of nylon-reinforced neoprene rubber and sold, for example, under the trade mark AIRSTROKE. The opposite ends of air bags 78,80 are secured to pairs of transverse channel members 82,84 extending between and rigidly secured to side walls 58,59.

Pairs of elongated links 64,65 are connected intermediate their ends to supporting links 96,98 pivotally secured to side walls 58,59 for substantially linear reciprocal travel of link pairs 64,65 and reciprocal travel of transverse channels 68,70 carried thereby between stops 94 positioned on side walls 58,59.

A lock bar 85 pivotally mounted on arms 87,89 is operatively connected to air cell 90 by rod 91 extending therebetween. Rod 91 is biased into a retracted position in cell 90 by a compression spring, not shown, to normally maintain lock bar 85 in abutment with the ends of pairs of linkages 64,65 and thus prevent accidental retraction and opening of gate 32.

An air supply with control valve, not shown, selectively supplies air under pressure to either of air bags 78,80 while permitting air to exhaust from the other of the air bags such that floating channels 68,70 are reciprocally actuated between stops 92,94. The linear reciprocal travel of link pairs 64,65 in turn is translated into angular travel of links 54,55 retracting links 50, upon expansion of air bag 78, to open gate 32 and extending links 50, upon expansion of air bag 80, to close gate 32. Lock bar 85 is selectively actuated by air cell 90 to the position shown in FIG. 9 to permit linkage pairs 64,65 to retract upon expansion of air bag 78.

Air cell 90 is single acting and in communication with the air supply to the air bags such that a signal to the air bags for expansion of air bag 78 results in actuation of cell 90 to extend rod 91 and retract lock bar 85 to clear the ends of linkage pairs 64,65 before their linear travel for opening of gate 32.

The hopper bottom can be opened to a desired width under close and positive control for controlled discharge of its contents and closed against the weight of the materials discharged by the combination of a novel closure gate and a novel pneumatic actuating system. The locking mechanism prevents accidental opening of the gate while providing automatic locking of the gate upon its closure.

What I claim as new and desire to protect by Letters Patent of the United States is:

1. A gate apparatus for use with a hopper bottom having a pair of opposed, mutually inclined end walls and a pair of spaced-apart side walls comprising, in combination, a substantially vertical lower portion formed in one of said inclined end walls defining a bottom edge extending the width of said end wall, said other inclined end wall defining a bottom edge extending the width of said end wall whereby said edges are spaced apart and parallel with each other to define a rectangular hopper opening therebetween extending from one side wall to the other, said bottom edge in the substantially vertical portion of the one end wall being higher than the bottom edge of the other end wall, an arcuate closure plate extending between said side walls and said end wall bottom edges adapted to close said hopper opening, said closure plate having end supports pivotally mounted in said side walls and having a transverse radius of curvature substantially equal to the radius of pivot of said end supports, each of said side walls between the bottom edges of the mutually-inclined end walls terminating in convexly-rounded edges having said radius of curvature, whereby said closure plate can pivot into and out of said opening in sealing engagement therewith, and actuating means for pivoting said closure plate into and out of said hopper opening comprising a pair of opposed air bags mounted within a frame rigidly connected to the underside of an inclined end wall, said air bags having adjacent ends and opposite ends, floating means including at least one transverse member secured to the adjacent ends of the air bags and secured to the linkage operatively connected to the closure gate interconnecting said air bags adjacent ends adapted for reciprocal substantially linear movement and stationary means including cross-members secured to the frame and secured to the opposite ends of the air bags rigidly connecting the opposite ends of the air bags to the frame, whereby selective expansion of one air bag by introduction of air under pressure thereto and exhaust of air from the other air bag permits linear movement of said floating means, and linkage including a pair of spaced parallel elongated links straddling the air bags, means for connecting the floating means transverse member to the said elongated links, pivotal means comprising a transverse shaft rotatably mounted within the frame, a first pair of spaced pivotal links each rigidly secured at one end to said shaft, means pivotally securing one end of said elongated links to said first pair of pivotal links, a second pair of pivotal links interconnecting the opposite end of the elongated links to the frame, whereby linear movement of said elongated links by said floating means pivots said first pair of pivotal links, and a second pair of elongated links pivotally connected to said first pair of pivotal links and to the closure plate whereby pivotal movement of said first pair of pivotal links actuates the said second pair of elongated links and the closure plate.

2. A gate apparatus as claimed in claim 1, in which the closure plate end supports are wedge-shaped having side edges diverging from the pivotal mounting to the closure plate, whereby the side edges adjacent the lowermost end wall bottom edge is substantially vertical when the closure gate is disposed within the rectangular hopper opening.

3. A gate apparatus as claimed in claim 2, in which the closure plate is adapted to pivot below the end wall and side wall bottom edges, and in which the lowermost end wall bottom edge has a flange lip formed therein rearward of said edge whereby the closure plate abuts said lip and overlaps the said lowermost bottom edge when the closure plate is disposed within the rectangular hopper opening.

4. A gate apparatus as claimed in claim 1 which additionally comprises a transverse lock bar pivotally mounted within the frame and operatively connected to an air cylinder adapted to abut and lock the elongated links from linear movement when the closure gate is in its closed position and to pivot out of abutment with the elongated links when said closure gate is to be opened.

* * * * *